United States Patent [19]
Betti

[11] Patent Number: 6,164,316
[45] Date of Patent: Dec. 26, 2000

[54] HIGH TEMPERATURE ROTATING UNION

[75] Inventor: Bruno Betti, Bologna, Italy

[73] Assignee: Deublin Company, Waukegan, Ill.

[21] Appl. No.: 09/470,865

[22] Filed: Dec. 23, 1999

[51] Int. Cl.[7] .................................................. F16K 31/12
[52] U.S. Cl. ........................ 137/338; 137/340; 137/580; 165/90
[58] Field of Search .................................. 137/580, 338, 137/340; 165/80.3, 90, 125

[56] References Cited

U.S. PATENT DOCUMENTS 4,683,912   8/1987   Dubrosky ................................. 137/580
5,778,971   7/1998   Szam ......................................... 165/90

FOREIGN PATENT DOCUMENTS 10 04467   3/1952   France ..................................... 137/340

*Primary Examiner*—A. Michael Chambers

[57] ABSTRACT

A rotating union has a plurality of fin members spaced about and extending radially outwardly from the rotor to provide an air circulation between the rotor and the bearing assembly to cool the bearing assembly. Additionally, the rotor may include a circumferential annual recess in the rotor outer wall which is enclosed by an annular sealing member to provide an air pocket or gap which insulates the bearing assembly from the hot fluid flowing through the rotating unions.

17 Claims, 5 Drawing Sheets

HIGH TEMPERATURE ROTATING UNION

BACKGROUND OF THE INVENTION

The present invention relates to rotating union coupling devices which have particular application in high temperature environments employing steam, hot water and hot oil applications.

Rotating unions have been used extensively in the paper, plastic and textile processing industries to couple the outlet of a fluid source to rotating drums or cylindrical rolls or to open gear paper machines. In known rotary unions utilized in coupling fluid sources to such rotating devices, the rotary unions utilize either carbon journal bearings or dual ball bearing structures to absorb and maintain the alignment of the rotor and the load of the joint assembly. However, such ball bearing assemblies are limited to a maximum temperature range of about 125° C. because of the thermal instability of the standard bearing materials above such temperatures. Also, when ball bearings assemblies are utilized as the rolling bearing structure within a rotary union, the ball bearing assembly must be grease lubricated which effectively limits the use of such bearing structures to application temperatures dictated by the bearing temperature limitations. Additionally, such ball bearing assemblies can be lubricated by the heat transfer oil, which is a relatively poor lubricant, and require that the assembly include at least dual bearing structures to provide support for the rotating rotor in the rotating union.

Another use of ball bearing structures in rotary union assemblies requires multiple seal assemblies and external buffer systems to maintain the thermal stability of the carbon bearing materials. Accordingly, such bearing structures are expensive and space consuming. Thus, when it is desired to provide rotating union assemblies capable of use at high temperatures and which include a simplified structure, such bearing assemblies have found limited application.

OBJECTS OF THE INVENTION

It is one object of the present invention to provide a rotary union assembly utilizing a single special bearing portion structurally arranged to withstand axial, radial and tilting loads on the assembly.

It is an object of the present invention to provide a rotary union assembly utilizing a single cross-cylindrical roller bearing or a single four point contact ball bearing structurally arranged to withstand axial, radial and tilting loads on the assembly.

It is another object of the present invention to provide a rotary union assembly having an insulating air pocket within the rotating rotor to provide and facilitate the cooling of the bearing assembly portion of the rotary union assembly.

It is a further object of the present invention to provide a rotary union assembly having structural fins integral and structurally arranged on the rotating rotor which facilitates air circulation to the bearing structure or portion of the rotary union to thereby minimize and maintain the bearing temperature within the operating conditions of the bearing structure.

It is yet another object of the present invention to provide a rotary union assembly having a radially and axially positioned bearing assembly which is spaced from the rotor to minimize the transfer of heat from the rotor union to the bearing assembly.

It is also another object of the present invention to provide a rotary union having a mechanical face seal assembly.

It is still another object of the present invention to provide a rotary union assembly having neutral buffer gas ports operatively associated with the mechanical face seal assembly to eliminate oxidation of the hot leaked oil from the mechanical face seal.

In one embodiment of the present invention, the rotary joint or union assembly includes a cylindrical housing, an end cap or head member, a tubular rotor member, a rotor bearing assembly and a mechanical face seal assembly comprised of a rotating seal member secured to the end of the tubular rotor and a non-rotating seal member mounted to a carrier or sleeve member axially moveable and positioned within the housing. The tubular rotor is mounted within the housing and is maintained in axial alignment with the non-rotating seal member by a rotor bearing assembly comprised of a single special bearing structure or portion in a non-heat stabilized condition and seated in a counterbore in the housing. The outer race member portion of the bearing structure or assembly is secured to the housing and the inner race member portion of the bearing assembly is secured to a shoulder of the rotor member.

The tubular rotor member includes cooling means which includes a circumferential recess extending therearound and positioned to the rotor wall. The circumferential recess is radially surrounded and enclosed by an annular sealing or insulating member to define and provide an air pocket or chamber between the rotor and the annular sealing member to insulate the bearing structure from the hot fluid flowing through the rotor. Also, the cooling means may include a plurality of fins radially extending outwardly from the rotor which impel and facilitate air circulation around and past the bearing assembly thereby maintaining the bearing temperature within acceptable levels of about 120° C. or less without externally supplied cooling. Such cooling means permits the use of non-heat stabilized bearings in the bearing assembly.

The radial and axial position and location of the bearing assembly within the cylindrical housing optimizes the bearing efficiency by minimizing the bearing operating temperatures during operation of the rotating assembly. The bearing assembly includes a single special bearing structure which does not require the bearing to be lubricated by a heat transfer oil, which is a relatively poor lubricant. Also, the bearing structure, because of its axial position within the housing with respect to the rotating rotor, handles both the radial and axial loads of the rotating rotor and provides improved tilting support in all directions of the rotor. Accordingly, the single special bearing structure provides a much higher load and speed capacity than carbon journal type bearings while being substantially more compact thereby requiring less space than dual ball bearing structures, as used in the prior art structures.

The present invention consists of certain novel features and structural details hereinafter fully described, illustrated in the accompanying drawings, and specifically pointed out in the appended claims, it being understood that various changes in the details may be made without departing from the spirit or sacrificing any of the advantages of the present invention.

DESCRIPTION OF THE DRAWINGS

The forgoing description and other characteristics, objects, features and advantages of the present invention will become more apparent upon consideration of the following detailed description, having reference to the accompanying drawings wherein.

DESCRIPTION OF PREFERRED EMBODIMENTS

Figure 1:
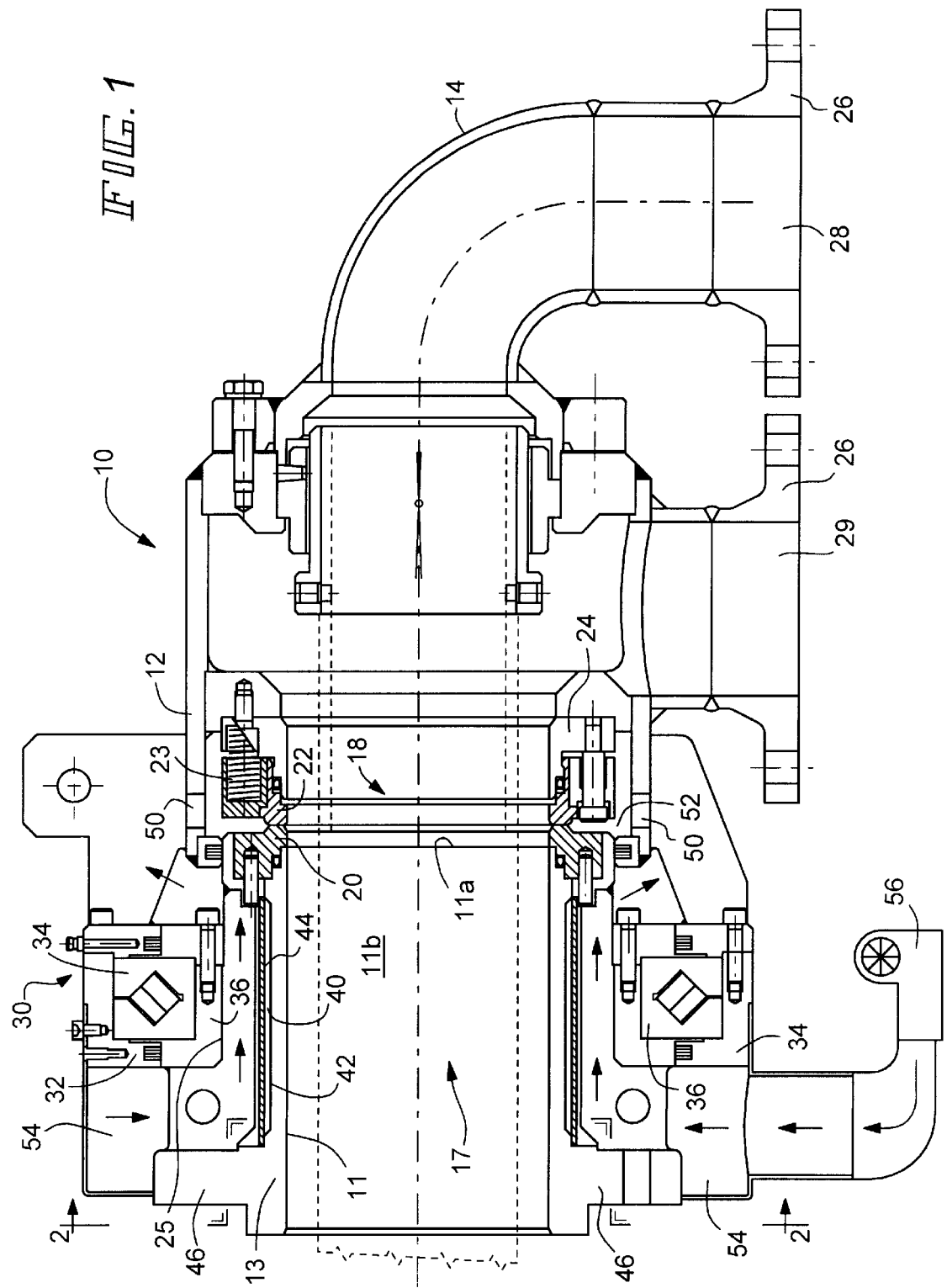
FIG. 1 is a cross-sectional view of a duoflow rotating joint in accordance with one embodiment of the present invention utilizing the inventive concepts in assembled operative relationship.

Referring to FIG. 1, there is illustrated a duoflow rotating union or joint assembly 10 which is designed for coupling a fluid source to a rotating drum or a calendaring roller (not shown). The rotating union assembly 10 includes a cylindrical housing 12, an end cap or head member 14, a tubular rotor member 11, a rotor bearing assembly 30 and a mechanical face seal assembly 18. The mechanical face seal assembly 18 is comprised of a rotating face seal member 20 secured to the end 11a of the tubular rotor 11 and a second non-rotating seal member 22 mounted to a carrier sleeve assembly 24 which is axially moveable within the housing 12 between a first position wherein the second seal member is spaced from the first seal member and a second position wherein the second seal member and the first seal member are engaged together to provide a seal between the rotor and the carrier. The tubular rotor 11 has an axial discharge bore or passageway 17 therethrough.

The rotor bearing assembly 30 includes a single special bearing assembly 32 positioned in a non-heat stabilized condition and seated in a counterbore in the housing 12 surrounding the inner stem portion 11b of the rotor 11. The outer race member portion 34 of the bearing assembly 30 is secured to the housing 12 and the inner race member portion 36 of the bearing assembly is structurally arranged to cooperate with shoulder 25 on the rotor member 11 to support rotation of the rotor.

Figure 3:
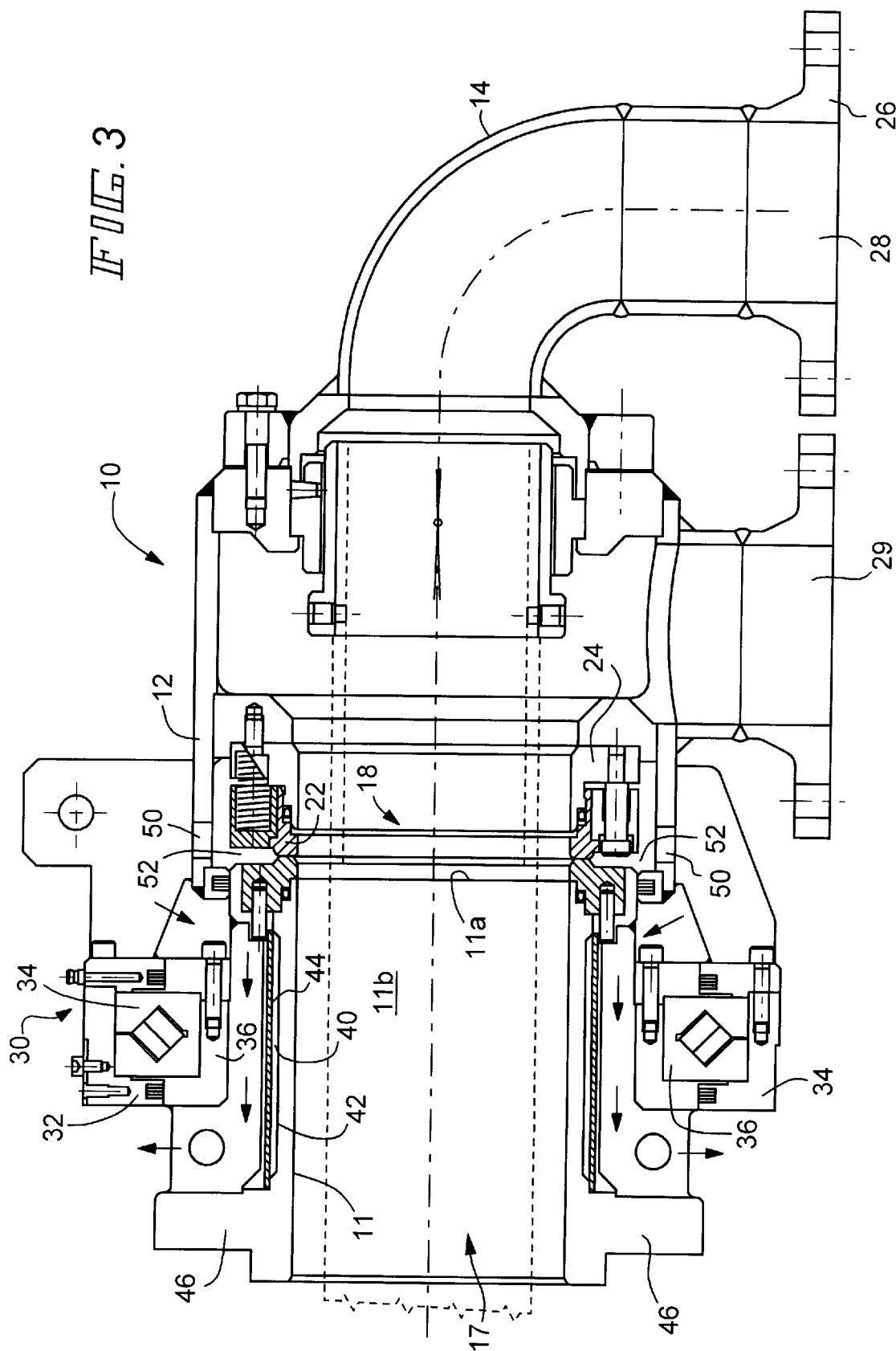
FIG. 3 is a cross-sectional view of a duoflow rotating joint in accordance with a further embodiment of the present invention utilizing the inventive concepts in assembled operative relationship.

The housing 12 or end cap or head member 14 includes flange portions 26 thereon for operatively connecting the union for supply and removal of the conveyed medium, as is known in the art. As shown in FIGS. 1 and 3, a duo-flow union is illustrated having first and second ports 28 and 29 respectively; and as shown in FIGS. 4 and 5, a monoflow union is illustrated having a single port 28.

Figure 2:
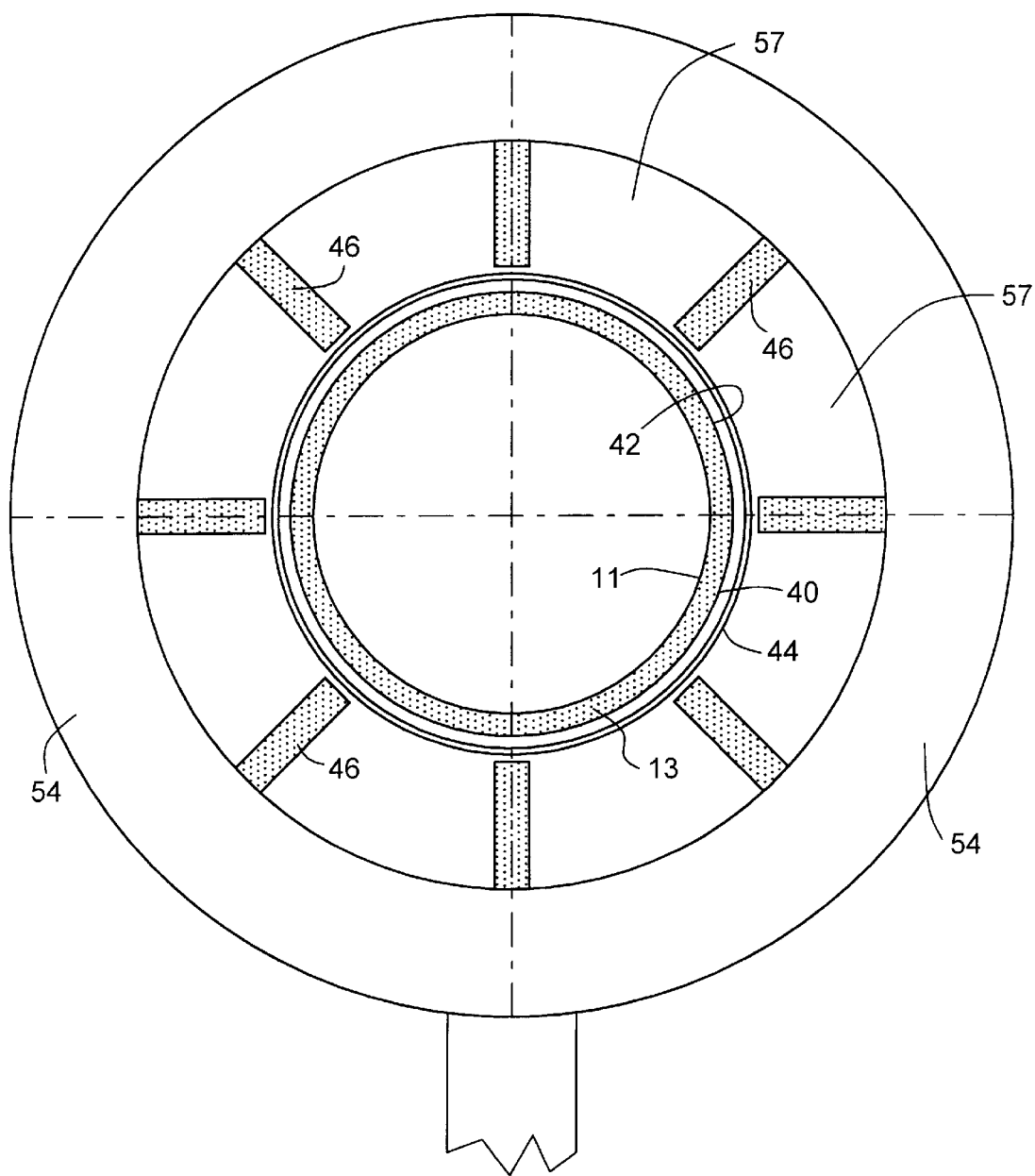
FIG. 2 is a view taken along lines 2—2 of FIG. 1.

In accordance with the present invention, the tubular rotor member 11 includes an insulating air gap or pocket 40 extending therearound. The air pocket 40 is defined by a recess 42 in the outer rotor wall 13 and positioned in a recess of the rotor wall 13 which is radially surrounded and sealed by an insulating member 44. The gap or air pocket 40 insulates the bearing assembly from the hot fluid flowing through the rotor discharge passageway 17 of the rotor 11. As shown in FIG. 2, the rotor 11 includes also a plurality of fins 46 equally spaced about the rotor and radially extending outwardly from the rotor which impels and facilitates air circulation around and past the bearing assembly 30 thereby maintaining the bearing temperature within acceptable levels of about 120° C. or less without the need of externally supplied cooling.

As shown in FIG. 2, in one embodiment of the present invention, eight fins 46 are shown radially extending outwardly from the rotor. However, the number of fins may vary so long as the fins are spaced equally about the rotor in a balanced fashion. The air cooling resulting from the fin rotation directs the air coolant through the gaps 57 between the fins 46 to cool the bearing assembly and permits the use of non-heat stabilized bearings in the bearing assembly. Moreover, the radial and axial position and location of the bearing assembly 30 within the cylindrical housing 12 optimizes the bearing efficiency by minimizing the bearing operating temperatures during operation of the rotating assembly. Thus, the operating conditions of the duoflow rotating joint 10 (FIG. 3) and the monoflow rotating joint 10 (FIG. 5) permit the flow of air coolant around the bearing assembly 30, as shown by the arrows in FIGS. 3 and 5.

Figure 4:
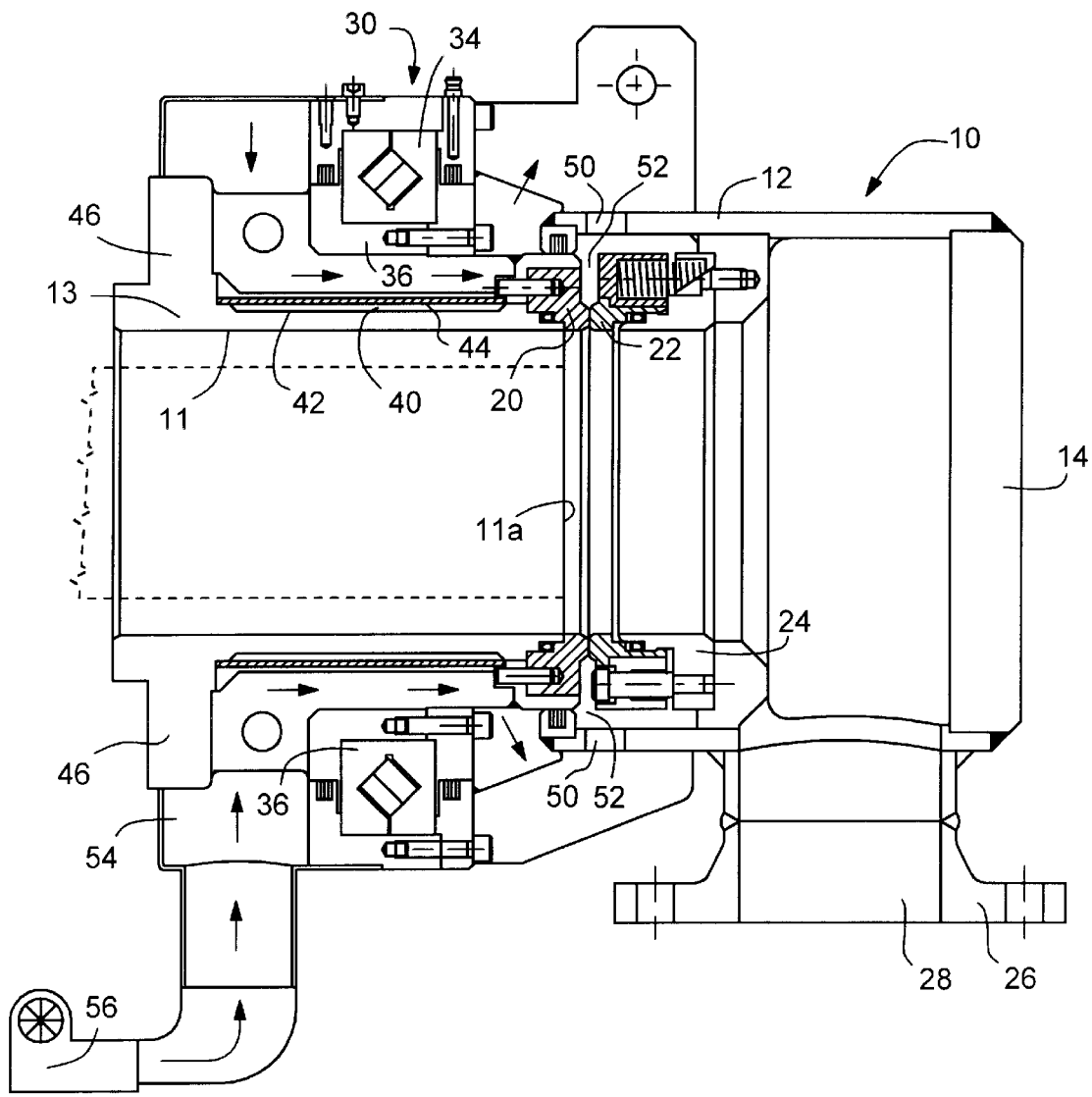
FIG. 4 is a cross-sectional view of monoflow rotating joint in accordance with the embodiment shown in FIG. 1 utilizing the inventive concepts in assembled operative relationship.
Figure 5:
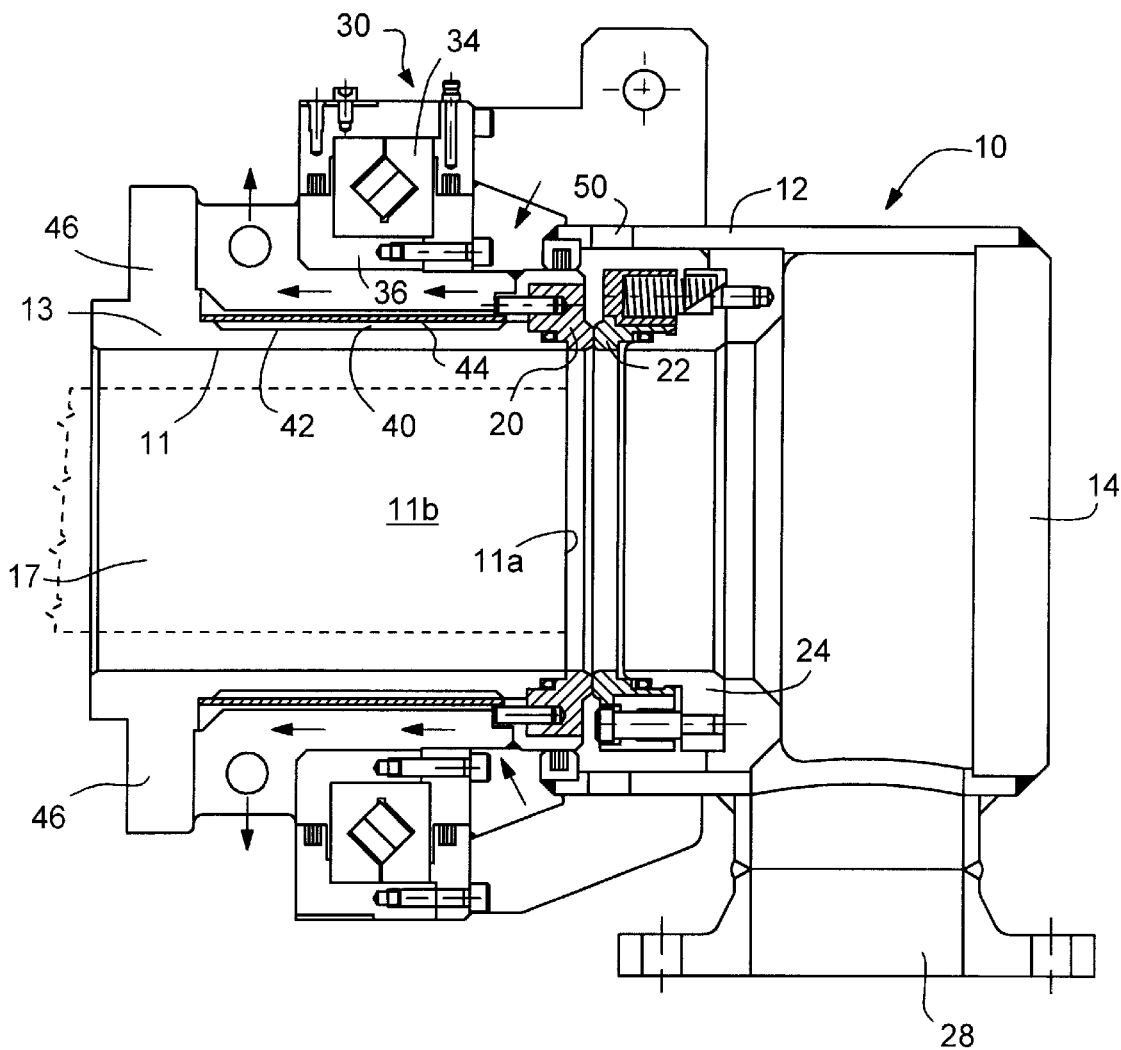
FIG. 5 is a cross-sectional view of a monoflow rotating joint in accordance with the embodiment shown in FIG. 3 utilizing the inventive concepts in assembled operative relationship.

In the embodiments of the present invention illustrated in FIGS. 1 and 4, the duoflow rotating joint (FIG. 1) and the monoflow rotating joint 10 (FIG. 4), if it is desired to increase the flow of air coolant around and past the bearing structure 30, the rotating union may include an annular channel 54 structurally arranged around the rotor 11 to direct air coolant from a blower 56 through the gaps 57 between the fins 46 to facilitate cooling of the bearing housing. This is shown by the arrows in FIGS. 1 and 4.

The unique design of the present rotating union utilizes a rotating seal member 20 mounted to the end 11a of the tubular rotor to provide the mechanical seal in conjunction with the non-rotating seal member 22 mounted to carrier assembly 24. As shown in FIGS. 1 and 3–5, the non-rotating seal member 22 is positioned in tandem with a separately mounted spring biased retaining member 23 which permits the non-rotating seal to float thereby minimizing seal face distortions from thermal gradients during operation of the rotating union 10.

Also as shown in FIGS. 1 and 3–5, the cylindrical housing includes ports 50 therein which communicate with the cavity surrounding the mechanical seal of the coolant union. The ports permit the injection of neutral buffer gases, such as nitrogen, to be directed through the ports 50 into the cavity 52 to eliminate oxidation of hot leaked oil that may escape from the mechanical seal face assembly 18. The use of neutral buffer gases provides for the control of any seal leakage of the mechanical face seal and provides excellent environmental protection and minimizes human exposure to the pumped fluids.

A single special bearing structure is desired because such a bearing structure does not require the bearing design to be lubricated by a heat transfer oil which is a relatively poor lubricant. Accordingly, utilization of an insulating air pocket and associated fin structure provides excellent air circulation about the bearing assembly and maintains the bearing assembly temperature within acceptable operational levels.

Moreover, the single bearing structure, because of its axial position and location within the housing with respect to the rotating rotor, handles both the radial and axial loads of the rotating rotor and provides improved support in all directions of the rotor. The special bearing design provides also a much higher load and speed capacity than carbon journal type bearings while being substantially more compact thereby requiring less space than a pair of journal ball bearings, as commonly used in the prior art structures.

What is claimed is:

1. In a duoflow rotating union having a housing, a tubular rotor rotatably mounted in the housing and adapted for coupling to a rotating device which is adapted to receive fluid conducted through the union and the tubular rotor, a carrier member axially movable in the housing, a rotating first seal member mounted to and rotatable with the rotor, non-rotating second seal means mounted to the carrier member for axial movement within the housing between a first position wherein the second seal member is spaced from the first seal member and a second position wherein the second seal member and the first seal member are engaged together to provide a rotating mechanical seal between the rotor and the tubular carrier, bearing means mounted to the housing for supporting the rotation of the rotor, and internal coolant means associated with the rotating union to cool the bearing means, said coolant means comprising:

a plurality of fin members equally spaced about and extending radially outwardly from the rotor to provide an air circulation between the rotor and the bearing means to cool the bearing means.

2. In the rotating union in accordance with claim 1, wherein said bearing means is a single special bearing assembly.

3. In the rotating union in accordance with claim 2, wherein said plurality of fin members is eight fin members.

4. In the rotating union in accordance with claim 1, wherein said coolant means further includes a circumferential annular recessed portion in the outer wall of the rotor, said recessed portion being enclosed by an annular sealing member extending about said annular recess to provide an air pocket between said outer wall of said rotor and said annular sealing member to insulate the bearing means from the hot fluid flowing through the rotating union.

5. In the rotating union in accordance with claim 1, wherein the housing includes ports structurally arranged to communicate with the rotating first seal means and the non-rotating second seal member to permit the introduction of neutral buffer gas to retard the oxidation of hot leaked oil from the mechanical seal.

6. In the rotating union in accordance with claim 1, wherein said plurality of fin members is six fin members.

7. In the rotating union in accordance with claim 1, wherein said coolant means further includes an annular channel structurally arranged to extend around said fin members on said rotor and to deliver forced air coolant to provide an air circulation between the rotor and the bearing means to cool the bearing means.

8. In a rotating union having a housing, a tubular rotor rotatably mounted in the housing and adapted for coupling to a rotating device which is adapted to receive fluid conducted through the union and the tubular rotor, a carrier member axially movable in the housing, a rotating first seal member mounted to and rotatable with the rotor, a non-rotating second seal member mounted to the carrier member for axial movement within the housing between a first position wherein the second seal member is spaced from the first seal member and a second position wherein the second seal member and first seal member are engaged together to provide a rotating mechanical seal between the rotor and the tubular carrier, bearing means mounted to the housing for supporting the rotation of the rotor, and internal coolant means associated with the rotating union to cool the bearing means, said coolant means comprising:

a circumferential annular recessed portion in the outer wall of the rotor enclosed by an annular sealing member extending about said annular recess to provide an air pocket between said rotor outer wall and said annular sealing member to insulate the bearing means from the hot fluid flowing through the rotating union.

9. In the rotating union in accordance with claim 8, wherein said bearing means is a single special bearing assembly.

10. In the rotating union in accordance with claim 8, wherein the housing includes ports structurally arranged to communicate with the rotating first seal means and the non-rotating second seal member to permit the introduction of neutral buffer gas to retard the oxidation of hot leaked oil from the mechanical seal.

11. In a monoflow rotating union having a housing, a tubular rotor rotatably mounted in the housing and adapted for coupling to a rotating device which is adapted to receive fluid conducted through the union and the tubular rotor, a carrier member axially movable in the housing, a rotating first seal member mounted to and rotatable with the rotor, non-rotating second seal means mounted to the carrier member for axial movement within the housing between a first position wherein the second seal member is spaced from the first seal member and a second position wherein the second seal member and the first seal member are engaged together to provide a rotating mechanical seal between the rotor and the tubular carrier, bearing means mounted to the housing for supporting the rotation of the rotor, and internal coolant means associated with the rotating union to cool the bearing means, said coolant means comprising:

a plurality of fin members equally spaced about and extending radially outwardly from the rotor to provide an air circulation between the rotor and the bearing means to cool the bearing means.

12. In the rotating union in accordance with claim 11, wherein said bearing means is a single cross-cylindrical roller bearing assembly.

13. In the rotating union in accordance with claim 12, wherein said plurality of fin members is eight fin members.

14. In the rotating union in accordance with claim 11, wherein said coolant means further includes a circumferential annular recessed portion in the outer wall of the rotor, said recessed portion being enclosed by an annular sealing member extending about said annular recess to provide an air pocket between said outer wall of said rotor and said annular sealing member to insulate the bearing means from the hot fluid flowing through the rotating union.

15. In the rotating union in accordance with claim 11, wherein the housing includes ports structurally arranged to communicate with the rotating first seal means and the non-rotating second seal member to permit the introduction of neutral buffer gas to retard the oxidation of hot leaked oil from the mechanical seal.

16. In the rotating union in accordance with claim 11, wherein said plurality of fin members is six fin members.

17. In the rotating union in accordance with claim 11, wherein said coolant means further includes an annular channel structurally arranged to extend around said fin members on said rotor and to deliver forced air coolant to provide an air circulation between the rotor and the bearing means to cool the bearing means.

\* \* \* \* \*